3,841,999
PROCESS AND APPARATUS FOR PURIFYING AND AERATING AQUACULTURE POOLS
John P. Bennett, Portola Valley, and George D. Bliss, Palo Alto, Calif., assignors to Syntex (U.S.A.) Inc., Palo Alto, Calif.
Filed Dec. 18, 1972, Ser. No. 315,995
Int. Cl. E04h 3/20
U.S. Cl. 210—17                    15 Claims

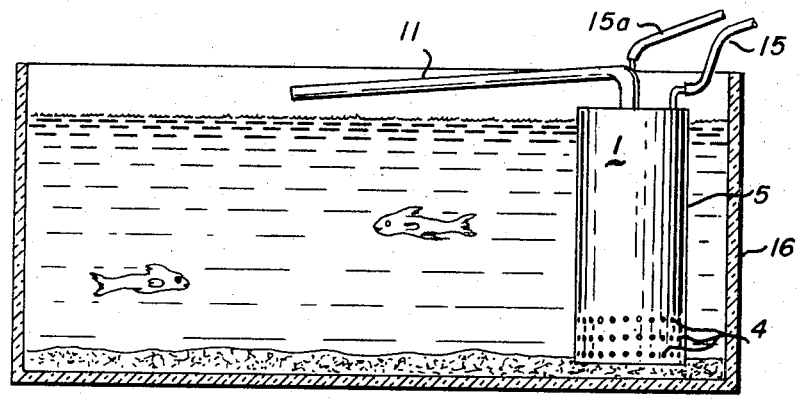
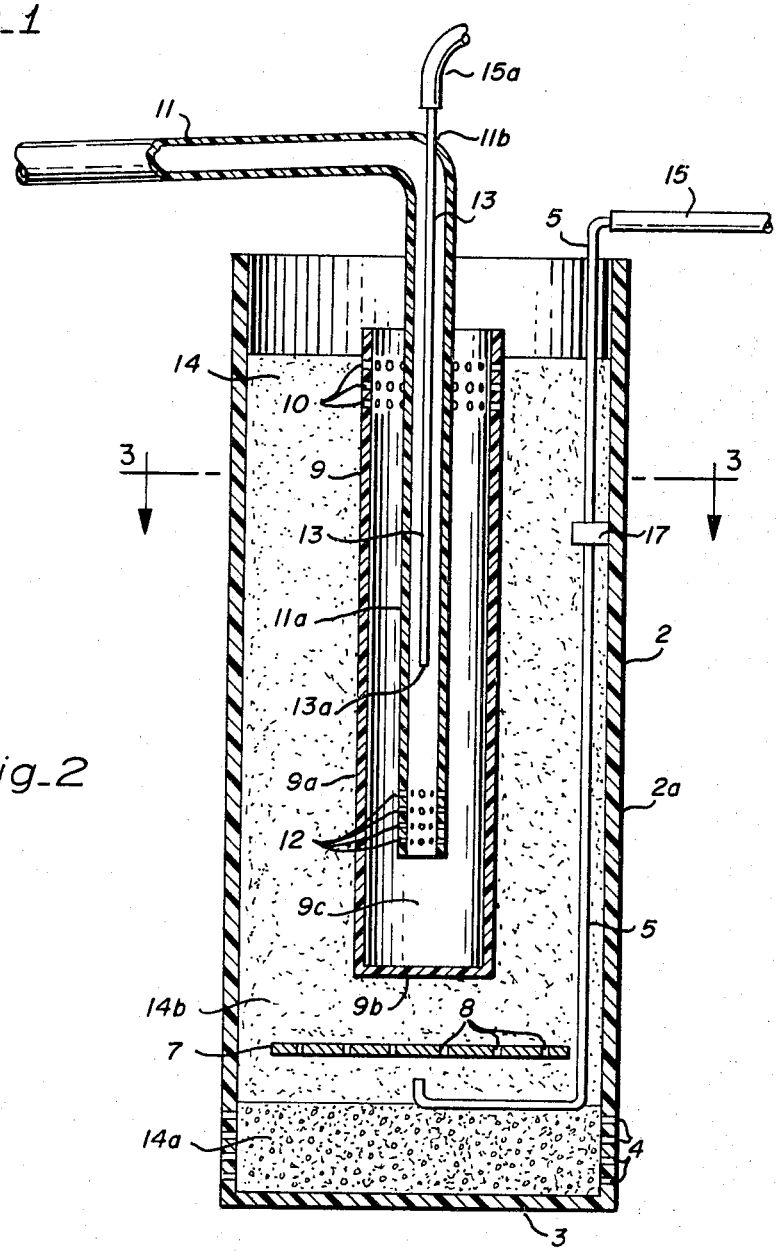

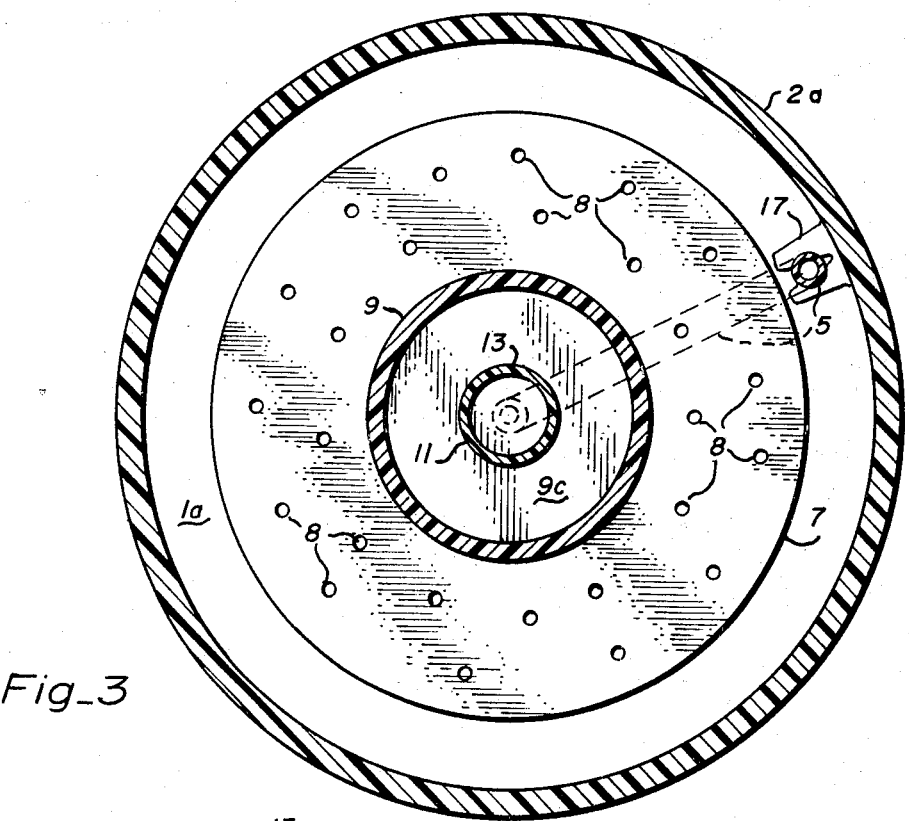
Fig_3
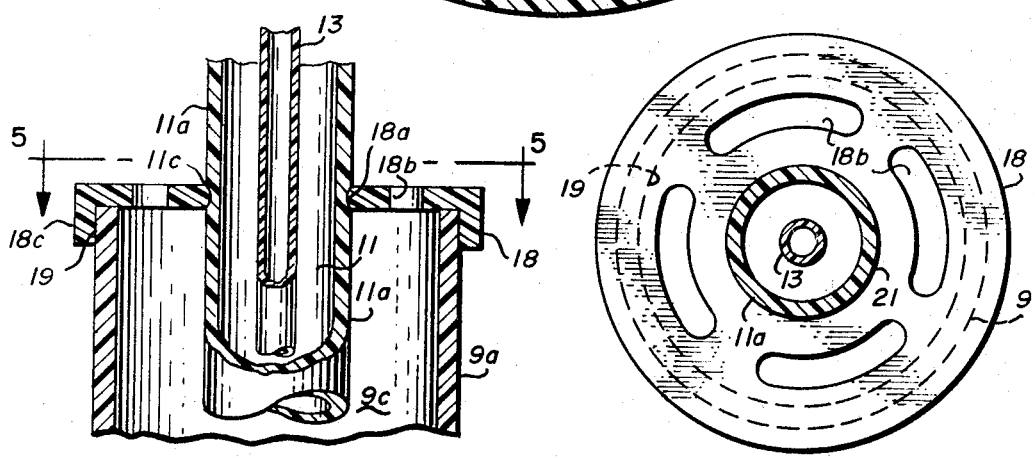
Fig_4      Fig_5
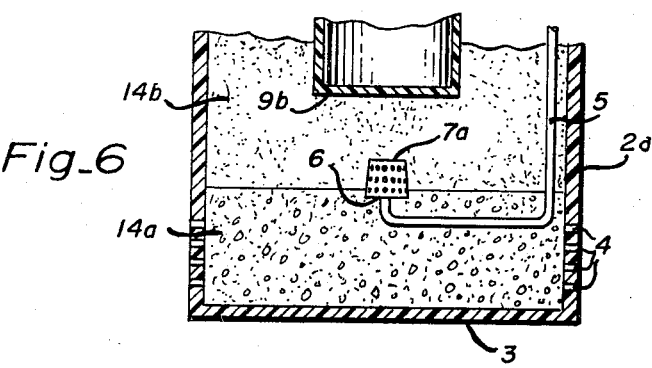
Fig_6

ABSTRACT OF THE DISCLOSURE

Apparatus and process for purifying and aerating water in aquaculture pools. The apparatus and process provide for the positive contact of organic contaminants entrapped by an aggregate filter bed with an air stream thereby promoting rapid biodegradation of the organic contaminants and further provide for the expulsion of undesirable gaseous products of the biodegradation and a second positive contact of the so purified water with a submerged air stream thus providing purified oxygen-rich water. The apparatus comprises a first coarse aggregate filter bed and a second smaller aggregate filter bed in contact with and vertically above the first filter bed; a sump for receiving purified water, a first air supply nozzle for supplying air to air lift water through the second filter bed whereby it is purified and then passed into the sump, and a second air supply nozzle located in the sump for aerating and air lifting water from the sump and discharging the purified oxygen-rich water

BACKGROUND OF THE INVENTION

(1) The invention

This invention relates to apparatus and processes for the purification and aeration of water used in aquaria or other aquaculture pools used for the containment of fish and/or crustacea and the like. In a further aspect, this invention relates to methods of making and using such apparatus and to aquaculture systems using such apparatus and processes.

(2) The prior art

Because of the relatively small size of aquaria as compared with the natural environment, the aquarium water becomes contaminated with organic waste, excess food, and water thriving organisms such as algae. These contaminants must be removed lest the water becomes so polluted as to be harmful to the fish or crustacea contained therein, and in the case of aquaria used for display purposes to prevent the water from becoming odoriferous and murky or otherwise esthetically displasing. In addition, the quantity of oxygen contained in the aquarium water, or normally generated by the aquarium life system is generally insufficient to sustain the animal life contained therein and thus additional oxygen (e.g. air) must be supplied to the aquarium water. Typically, the prior art has tried to alleviate these problems by the use of filter systems which pass the contaminated water through filter beds containing glass wool, charcoal, or other media having large surface areas but only small intersititial spaces between the individual particles, or combinations of such media, which collect or absorb contaminants, and by the use of aerators which aerate and pump the filtered water back to the aquarium or which aerate the aquarium water directly. The accumulation of contaminants within the filter bed creates ideal conditions for the growth of anaerobic bacteria which in turn causes the filter bed to "slime-up" and further produce toxins as anaerobic biodegradation products which are harmful to the aquarium animal life. These toxins are then circulated to the aquarium in the filtered water resulting in a toxin build-up within the aquarium which, if left unchecked, could result in the death of the aquarium animal life. Further, this slime-up, as well as being odoriferous, results in the filter clogging up long before it would be expected to clog, based on the quantity of contaminants accumulated. Thus, these filters must be frequently cleaned and the filter element or filter bed medium replaced. Accordingly, we have now invented a combination filtration, purification and aeration apparatus, utilizing aerobic biodeterioration, which is able to operate effectively for periods longer than would be expected, based on the quantity of contaminants removed and which is able to operate effectively for periods up to one year and longer, and which does not produce a toxin build-up in the aquarium or aquaculture pool.

A few prior art aquarium filtration devices eluting to aerobic biodegradation of contaminants are described in U.S. Pats. 3,578,169 and 3,693,798. However, these prior art devices either really still primarily function anerobically, as in the case of devices described in U.S. Pat. 3,578,169, or are relatively complex as, for example, as in the case of the devices described in U.S. Pat. 3,693,798. In contrast to this, we have invented a filtration, purification, aeration device which functions extremely efficiently and which is very simple both in construction and operation.

SUMMARY OF THE INVENTION

In summary the apparatus of the invention comprises an elongate container means open at the top and having passage means located near the lower end thereof adapted for receiving contaminated water; a first coarse aggregate filter bed located at the bottom of said container, a second smaller aggregate filter bed of substantially greater depth than said first filter bed, vertically positioned above, and in contact with said first filter bed and extending to near but below the top of said container, a first air supply means positioned near the interface of said first and second filter beds whereby air supplied thereby promotes aerobic bacteria and causes water to be air lifted through said second filter bed; a sump means positioned within said second filter bed for receiving water passing through said second filter bed; a conduit means located in said sump means for discharging water therethrough and a second air supply means located within said conduit means whereby air supplied by said second air supply means aerates and air lifts water from said sump through said conduit means whereby purified and aerated water is discharged from said conduit.

In summary the process of our invention for purifying and aerating aquaculture pools comprises two primary steps; a first primary step comprising drawing contaminated water, containing organic contaminants, from said aquaculture pool through a first filter bed of coarse hard surfaced low absorption aggregate whereby large particle-size contaminants are entrapped and attrited by the action of said water passing through the filter bed, and contacting the water passing through said first filter bed with a stream of air flowing at a sufficient rate and pressure to vertically propel the contacted water through a second filter bed, of smaller particle-sized, hard surfaced, low absorption aggregate, of greater depth than said first filter bed whereby smaller sized organic contaminants are entrapped by said second filter bed and aerobically biodegradated via the action of aerobic bacteria induced and promoted by the air stream; and a second primary step comprising venting excess air and gaseous byproducts of the aerobic biodegradation from the water passing through said second filter bed, collecting said water in a sump or reservoir and aerating the collected water by bubbling air therethrough and then discharging the aerated purified water to an aquaculture pool. Typically, in a unit sized to purify 5 to 10 gallon aquaria, the aggregate in the first filter bed will have a particle-size range of about from ¼ to ½ inch and the aggregate in the second filter bed a particle-size range of about from ⅛ to ¼ inch.

In a preferred embodiment of the process, air is bubbled through the water in the sump at a sufficient rate to air lift the water via a suitable conduit to a level where it can flow to the aquaculture pool via gravity. Also, although the process and apparatus has been, and will be, described with respect to the use of air, other suitable oxygen containing gaseous mixtures could also be used in either or both of the primary steps described above and also in place of either or both of the air supply means in the apparatus.

The invention will be further described herein below.

BRIEF DESCRIPTION OF THE DRAWINGS

The invention will be further described herein below with respect to the drawings wherein like reference numericals refer to the same or alike parts, but the invention is not limited thereto as various other embodiments and modifications can be made without departing from the essence and scope of the invention, wherein:

FIG. 1 is a verticle section through an aquarium illustrating the operation of our purification-aeration apparatus.

FIG. 2 is a verticle section through our purification-aeration apparatus.

FIG. 3 is a horizontal section taken approximately on line 3—3 of FIG. 2 but omitting the filter bed for purposes of clarity.

FIG. 4 is a verticle section of the top of the sump showing a modification of the sump element of our purification-aeration apparatus.

FIG. 5 is a plan view taken approximately on line 5—5 of FIG. 4.

FIG. 6 is a verticle section of the lower portion of our purification-aeration showing a preferred embodiment.

FURTHER DESCRIPTION OF THE INVENTION

Referring to FIG. 1, this figure illustrates a typical application and operation of our purification-aeration apparatus in an aquarium tank 16. In operation, contaminated water is drawn through the holes or passages 4 in the outer container wall 2a into the body of the apparatus and then purified and aerated and discharged back to the aquarium via discharge conduit 11. Air is supplied to the apparatus 1 via conduit means 15 and 15a (typically flexible tubing) for purposes of aerating and pumping the water through the apparatus and back to the aquarium tank and also for purposes of supplying oxygen to facilitate aerobic biodegradation of the contaminants trapped by the filter.

Referring now to FIGS. 2 and 3 which show the internal structure of our apparatus in detail, the apparatus comprises an outer container or casing 2 which comprises an elongate generally cylindrical wall 2a open at the top end and closed at the lower end by bottom wall 3, thereby defining container chamber 1a. Wall 3 is preferably generally perpendicular to wall 2a thereto to facilitate its stable positioning at the bottom of an aquarium or pool. Also, although it is preferable that wall 2a be generally cylindrical or in section defining a circle as shown in FIG. 3, to facilitate construction and ease of cleaning, other cross sectional configuration shapes could also be used, for example, squares or rectangulars, elliptical or triangular shapes and the like can also be used. Further, to ensure sufficient space within container 2 for the proper depth of filter bed 14, wall 2a should have an internal length of at least twice the internal diameter or mean diagonal passing through the center of the planner cross-sectional area defined by wall or walls 2a.

Thus, for example, where the apparatus has walls having a cylindrical internal diameter of 6 inches, wall 2 should have an internal length of at least 12 inches. Wall 2 has a number of holes or passages 4 extending therethrough to permit contaminated water to flow into the interior of the apparatus and also serve as a crude filter to prevent large objects from flowing into the filter. Passages 4 are distributed adjacent or near the bottom wall 3 and preferably are distributed throughout the entire periphery of wall 2a. Preferably, holes 4 do not extend upperly from wall 3 beyond ¼ of the total length of wall 2a. Passages 4 should have a diameter smaller than the median particle size of the aggregate used in the adjacent portion of filter bed 14 and typically have a diameter of ⅛ inch or less. Tubular air supply means 5 supplies air via nozzle 6 to the lower portion of the interior of the filter aparatus and is positioned within the apparatus such that nozzle 6 will be generally horizontally centered within the aparatus on the verticle axis and located at the lower end of the apparatus but above holes 4, to ensure that air supplied via nozzle 6 will not flow through passages 4.

Flow distribution plate 7 is generally centered in container chamber 1a above the outlet of nozzle 6 and preferably has the same cross-sectional configuration as container 2 but of reduced size or area as is more clearly illustrated in FIG. 3. Plate 7 has a number of passages 8 therethrough to provide for the passage of air from nozzle 6 and drawn water. Passages 8 distribute the air supplied by nozzle 6 evenly throughout the cross-section of the filter bed 14 and can be conveniently distributed throughout plate 7 as one or more concentric rings. In the embodiment shown in FIG. 3, passages 8 are distributed throughout plate 7 as two concentric rings having diameters greater than sump means.

Since plate 7 has no filter bed aggregate retaining function, the size of passages 8 can vary substantially. However, typically passages 8 will have a diameter in the range of about ½₂ to ⅛ inch, typically about ¹⁄₁₆ inch. Sump means 9 is generally centered above plate 7 and nozzle and is generally an elongate closed tubular structure defined by cylindrical wall 9a closed at the lower end by wall 9b, defining a sump chamber 9c for receiving purified water. Although sump wall 9a is shown as defining a circle in cross section, other configurations could be used as in the case of container wall 2a. Sump means 9 is positioned such that lower pump wall 9b is located in relatively close spaced relationship to plate 7 and such that sump wall 9a extends upwardly generally parallel to container wall 2a and terminates below the top of container wall 2a. This is to ensure that in the event filter bed 14 overflows, the overflow water will pass over the top of sump wall 9a, and fall into the sump chamber 9c. Sump passages 10 extend through wall 9a so as to permit purified water to pass from the filter bed 14 into the sump chamber. Passages 10 are confined to the upper portion of wall 9a and should be located no lower than the upper quarter portion of wall 9a, and preferably no lower than the upper eighth portion, and should be distributed throughout the entire pheriphery of wall 9a. Passages 10 should have a diameter less than the median particle size of the filter bed aggregate adjacent thereto to ensure that the sump chamber will not fill up with filter bed aggregate. Sump 9 can be conveniently fabricated from conventional piping materials in which case bottom wall 9b can be conveniently a conventional removal threaded cap, thus facilitating cleaning of sump 9. Air supply tube 5, plate 7 and sump 9 are typically stabilized in place by the aggregate filter bed 14 without requiring any positioning or stabilizing medians. However, alternatively, spacing means can be used to ensure the proper positioning of these elements. For example, the air supply tubes can be positioned and stabilized in place by one or more spacing clamps 17 affixed to wall 2a shown in FIGS. 2 and 3. Preferably, spacing clamp 17 is constructed of a semi-flexible material, such as polyethylene and the like, so that air supply tube 5 can be readily "snapped" in place within clamp 17. Also, where wall 2a and clamp 17 are constructed of the same or compatible moldable materials, clamp 17 can be constructed as an integrated part of wall 2a.

Sump discharge means 11 is a conduit or tube having an external diameter substantially less than the internal diameter of sump wall 9a and extends into the sump chamber to a position substantially near, but spaced from, bottom sump wall 9b. Sump discharge means 11 is positioned such that discharge means wall 11a is generally in spaced parallel relationship to sump wall 9a. The lower portion of the sump discharge means wall 11a is supplied with passages 12 which extend through the wall 11a to permit water from the sump chamber to pass therethrough. Sump discharge means 11 can be fixed in position by any suitable clamping means affixed to the upper horizontally oriented portion of the sump discharge tube or can be fixed by spacing and positioning means affixed to the top of sump wall 9a such as, for example, the positioning cap 18 shown in FIG. 4. Preferably the horizontal portion of 11 is angled slightly downwardly. The upper portion of discharge means 11 has an air supply means receiving passage 11b. Sump air supply tube means 13 passes through passage 11b and preferably is in friction fit therewith, thus serving to position nozzle 13a with respect to passages 12 and the external tube 13 wall with respect to the internal wall of sump discharge tube 11. The lower end of tube 13 terminates with nozzle 13a which is generally centered within discharge tube 11 at a position above passages 12 so as to ensure that air supplied by nozzle 13a will not pass through passages 12. The upper end of tube 13 is connected via conduit 15a to an air supply means.

Aggregate filter bed 14 extends from container wall 3 throughout the entire container chamber to a level slightly above passages 10 in sump wall 9a but below the top of sump wall 9a to ensure that aggregate will not overflow into the sump chamber. Filter bed 14 is composed of two filter bed sections; a first filter bed 14a of coarse aggregate which extends from bottom wall 3 to slightly above the uppermost passage 4 and a second filter 14b of smaller particle size aggregate which extends from the coarse aggregate filter bed to the top of the filter bed. The first filter bed is composed of relatively large particle-size aggregate, which serves to remove large particle-sized contaminants which would cause too great of pressure drop across the small size aggregate filter bed. The remaining portion of the filter bed extending from the coarse aggregate to the top of the filter bed is composed of smaller sized aggregate in order to entrap the finer or smaller sized contaminants.

Thus, for example, in filter units having a total aggregate filter bed volume of about from ½ to ¾ gallon, such as would be especially suited, to purify and aerate 5 to 10 gallon aquariums, the coarse filter bed will preferably have an aggregate particle-size range of about from ¼ to ½ inch and the second filter bed will preferably have an aggregate particle-size range of about from ⅛ to ¼ inch. Correspondingly, larger particle size aggregate will typically be used in larger units and smaller size aggregate will typically be used in smaller units. As can be seen from FIG. 2, the depth of the second filter bed 14b is substantially greater than the first filter bed 14a, since the aerobic biodeterioration occurs in the second filter bed and thus a greater residency time is desirable. It is essential that the filter bed aggregate in each instance be composed of a material having a relatively hard, smooth surface such as, for example, gravel or sand, having relatively few surface pores, and accordingly low absorption capacity, to ensure that substantial quantities of contaminants are not absorbed by such surface pores and thus occluded from contact with the air supplied to the second filter bed and hence subjected to anaerobic biodegradation and also to ensure that the coarse aggregate filter bed will not adsorb a large amount of contaminants, including small particle-size contaminants, and thus slime-up. Also, where it is desired to purify and aerate exceptionally large aquaculture pools, such as used in large scale commercial operations used for food purposes, it is sometimes desirable to proceed the coarse filter bed with a filter bed of still coarser aggregate.

Further, although much superior results are obtained using the system of two filter beds described above, a single filter bed of the same or an undefined particle size range could also be used where less stringent contamination problems or requirements are present. Similarly, a plurality of filter bed layers composed of different particle-size ranges of aggregate, preferably of diminishing sizes, could also be used, although typically no meaningful, if any, advantage over the two filter bed system described above is obtained.

In the preferred embodiment, shown in FIG. 6, distribution plate 7 is replaced with a dispersing cap 7a affixed directly to nozzle 6. Such dispersing caps are conventionally used in conjunction with aerators or air lift pumps and are typically constructed of porous stone, or other porous material, which serves to break up or disperse the air stream into small air bubbles distributed over the periphery of the dispersing cap. The use of such dispersing caps is, for example, described in U.S. Pat. 2,782,161. Alternatively, both the distribution plate 7 and dispersing cap can be omitted, resulting, however, in substantial loss of efficiency, or both the distribution plate and dispersing cap can be used, resulting in enhanced efficiency. Typically, however, we prefer to use only one of the air distribution devices as the enhancement in efficiency, achieved by using two air distribution devices, is not generally sufficient to justify the use of both the devices. Further, as between the distribution plate 7 and the dispersing cap, we prefer to use the dispersing cap as smaller air bubbles are given off and accordingly better air contact with the entrapped organic contaminants is obtained.

Referring to FIGS. 4 and 5, these figures illustrate a spacing cap means for positioning and stabilizing sump discharge means 11 with respect to the sump chamber. Spacing cap 18 has generally the same cross-sectional configuration as the outer periphery of sump wall 9a and is designed to fit over the upper end of sump wall 9a. Downwardly, extending lip 18c has an internal wall diameter essentially the same as the outer diameter of sump wall 9a or slightly larger thereof. The internal wall of lip 18c can form an interface 19 with the external sump means 9a, as shown in FIG. 4, or can be slightly spaced therefrom. The fit betwen lip 18c and wall 9a can either be a close friction fit as shown in FIG. 4 or can be loose fit since the purpose of this lip is to generally laterally position and stabilize the external wall of sump discharge means 11 with respect to the internal wall of the sump means. Cap 18 has a central passage 21 corresponding in configuration to the cross-sectional configuration of wall 11a and is adapted to permit the passage of tubular wall 11a, in close friction fit therewith. Preferably, tubular wall 11a is provided with peripheral groove 11c in its external wall and preferably the inner edge 18a, defining the central passage 21 in cap 18, is slightly rounded and of such diameter to facilitate a tight fit between edge 18a and peripheral groove 11c. This general tongue-in-groove fit provides both support and stability for discharge tube means 11 and further properly fixes the vertical position of the lower end of discharge tube means 11 and passages 12 therein with respect to the sump chamber and bottom sump wall 9b. Additional support for the sump discharge tube means can be conveniently supplied, if desired, by external clamping or support means attached to or supporting the upper generally horizontally extending portion of sump discharge tube means 11.

Assembly

As is believed apparent, the component parts of our purification-aeration device can be easily assembled. For example, one need only to fill the container chamber 1a with coarse aggregate to a level slightly above the height of the uppermost passage 4 in the container wall. Air supply tube 5 can then be positioned on the coarse aggregate with nozzle 6 generally centered within the chamber as shown in FIGS. 2 and 3. In the case where the container wall 2a is supplied with a clamping spacing means 17, the air supply tube can be easily snapped in place within the clamping means and then nozzle 6, and if provided with an air dispersing cap, the air dispersing cap positioned as before. Sufficient coarse aggregate or small particle-size aggregate is added to raise the level of the filter bed above nozzle 6. Preferably, the level of the filter bed should be raised at least ½ inch above the outlet of nozle 6. Distribution plate 7 is then positioned and centered on the filter bed within the container chamber as shown in FIGS. 2 and 3. Additional small particle-size aggregate is then added sufficient to position sump means 9 at the desired height. Sump means 9 is then centered in the container chamber with the bottom wall 9b resting on the aggregate bed with sump wall 9a generally parallel with container wall 2a. Additional small particle-size aggregate is then added sufficient to raise the level of the filter bed to level preferably slightly above the uppermost passage 10 in sump wall 9a. The partially assembled purification apparatus is then preferably placed in the desired location in the aquarium or pool with bottom wall 3 resting on the bottom of the aquarium. Discharge means 11 is then properly positioned within the sump chamber, preferably with air supply tube 13 already properly positioned therein through passage 11b and stabilized in friction fit therewith, as shown in FIGS. 2 and 3. The horizontally oriented portion of sump discharge tube 11 is then positioned to discharge purified aerated water back to the aquarium as shown in FIG. 1. The sump discharge means can be supported and stabilized in position by external clamping or support means applied to the horizontally oriented upper portion of a sump discharge, as previously described, and/or via internal support means such as shown in FIGS. 4 and 5. Air supply tube means 5 and air supply tube means 13 are then connected to air conduit means 15 and 15a, typically flexible tubing, which are then connected to the same or different suitable air supply means, e.g. air pump. However, where the same air supply means as used to supply both air supply means 13 and air supply means 5, the supply lines should be provided with suitable valving means to permit the regulation of the relative flow of air to air means 5 and air supply 13. The air flow is then adjusted to provide a suitable rate of air and water flow through the apparatus without disruption of the filter bed aggregate. Generally, the flow rate is adjusted to provide complete recirculation of the aquaculture pool about every one to two hours depending on the amount of, or the rate of, contamination in the aquaculture pool.

With the obvious exception of the filter bed aggregate, the container 2 and the other component parts of our apparatus can be made of any suitable rigid or semi-rigid water resistant material. We have found that conventional plastic materials such as polyethylene, polypropylene, polyvinylchloride, plexiglass, and the like, are particularly suitable materials of construction.

Operation

One of the primary features of our purification-aeration apparatus is its simplicity and ease of operation. The filter unit is positioned in the aquarium or other pool, as shown in FIG. 1, and then air supplied to air supply means 5 and 13. The air supplied via nozzle 6 acts as an air lift pump causing contaminated water to be drawn through passages 4 into the container chamber. This water is then drawn upwardly through the filter bed via the air lift action and distributed throughout the cross section of the filter bed via passages 8 in distribution plate 7 and through the annular passage existing between the inner wall 2a and the periphery of plate 7. As the contaminated water passes through the filter bed aggregate, large size contaminants are accumulated by the coarse aggregate in the first filter bed and in the case of large particle-size organic contaminants which are generally friable, the contaminants are broken or attrited into smaller sized particles by the action of the water passing through the filter bed, small particle size contaminants are trapped by the second filter bed and subjected to aerobic biodeterioration induced and propagated by the positive contact with the air supplied by nozzle means 6. The air lifted purified water then passes through passages 10 into the sump chamber, while at the same time excess air and gaseous products (e.g. ammonia, nitrogen dioxide, etc.) of the aerobic degradation escape from the top of the filter bed and are innoculously vented to the atmosphere. The purified water accumulated in the sump chamber is then drawn through passages 12 and the lower open end of the sump discharge tube means into the sump discharge tube, by the air lift pump action of the air supplied by nozzle 13a. The water is then aerated and air lifted through the discharge tube means 11 and discharged back to the aquarium resulting in an efficient supply of aerated purified water being recirculated to the aquarium.

In a further embodiment, our purification-aeration apparatus can be placed in a reservoir of contaminated water, remote from the aquaculture pool (e.g. aquarium) which is fed with contaminated water from the aquaculture pool via a syphon conduit or via a suitable positive pumping means. The purified aerated water flowing from our apparatus can then be discharged either directly to the aquaculture pool or can be discharged to secondary pumping means and then pumped back to the aquaculture pool. The use of a remote reservoir system is especially useful in small aquariums or where, for esthetic reasons, it is not desired to place the purification-aeration apparatus in the aquarium. The remote reservoir system is also especially useful in relatively large aquaculture pools, such as for example, used in commercial operations, thus affording greater ease of assessibility to the purification-aeration apparatus and flexibility in that by the use of suitable piping and valving means, the same purification-aeration apparatus can be used to service different aquaculture pools.

Obviously, many modifications and variations of the invention, described herein above and below in the Claims, can be made without departing from the essence and scope thereof.

What is claimed is:

1. A purification and aeration apparatus, adapted to be positioned in an aquaculture pool, comprising an elongated container means having elongate wall means and a bottom wall means closing said elongate wall means thereby defining an elongate container chamber closed on three sides and open at the top, container passage means positioned in said elongate wall means generally adjacent to said bottom wall means for supplying contaminated water to the bottom of said chamber; container air supply means for supplying an air stream to the lower portion of said container chamber at a point above said container passage means; an air distribution means positioned in said container chamber for dispersing and distributing air supplied via said container air supply means; a sump means positioned in said container chamber for receiving purified water; a filter bed of aggregrate located in said container chamber extending from said bottom wall means throughout the heretofore unoccupied space in said container chamber and generally surrounding at least a major portion of said sump means to a level near the top of said elongate container wall, said aggregate being composed of a material having a hard smooth surface having relatively few surface pores and low absorption capacity; sump inlet means for supplying purified water to said sump means; whereby contaminated water is drawn through said container passage means into said filter bed and is air lifted therethrough whereby small particle organic contaminants are entrapped by said filter bed and aerobically biodegraded and excess air and gaseous products of the biodegradation are vented from the water and whereby the water passing through said filter bed is purified and passes into said sump means via said sump inlet means; sump discharge conduit means positioned in said sump means for discharging said purified water from said sump means, sump air supply means for supplying air near the bottom of said sump means whereby said purified water in said sump means is aerated and air lifted through said sump discharge conduit means and discharged therefrom.

2. The apparatus of claim 1 wherein said air distribution means is a porous dispersing cap affixed to the outlet of said container air supply means.

3. The apparatus of claim 1 wherein said air distribution means is a thin plate, having a number of passages therethrough distributed over the area of said plate, and wherein said plate is positioned above the outlet of said container air supply means whereby the air stream supplied by said container air supply means impinges on said plate and is dispersed and distributed through said passages.

4. A purification and aeration apparatus, adapted to be positioned in an aquaculture pool, comprising an elongated container means having elongate wall means and a bottom wall means closing said elongate wall means thereby defining an elongate container chamber closed on three sides and open at the top, container passage means positioned in said elongate wall means generally adjacent to said bottom wall means for supplying contaminated water to the bottom of said chamber, container air supply means for supplying an air stream to the lower portion of said container chamber at a point above said container passage means; a sump means positioned in said container chamber for receiving purified water; a first filter bed of coarse aggregate located in said container chamber extending from said bottom wall means throughout the heretofore unoccupied space in said container chamber to a level slightly above said container passage means; a second filter bed of aggregate, having a smaller particle size than said coarse aggregate, and extending from said first filter bed throughout the heretofore unoccupield space in said container chamber and generally surrounding at least a major portion of said sump means to a level near the top of said elongate container wall, said coarse aggregate and said smaller particle size aggregate being composed of a material having a hard smooth surface having relatively few surface pores and low absorption capacity; sump inlet means for supplying purified water to said sump means; whereby contaminated water is drawn through said container passage means into and through said first filter bed and is air lifted through said second filter bed whereby small particle organic contaminants are entrapped by said second filter bed and aerobically biodegraded and excess air and gaseous products of the biodegradation are vented from the water and whereby the water passing through said second filter bed is purified and passes into said sump means via said sump inlet means; sump discharge conduit means positioned in said sump means for discharging said purified water from said sump means, sump air supply means for supplying air near the bottom of said sump means whereby said purified water in said sump means is aerated and air lifted through said sump discharge conduit means and discharged therefrom.

5. The apparatus of claim 4 wherein said coarse aggregate has a particle-size range of about from ¼ to ½ inches and said second filter bed aggregate has a particle size range of about from ⅛ to ¼ inches.

6. The apparatus of claim 5 wherein said sump inlet means are distributed throughout the entire periphery of a section of said elongate sump wall means extending downwardly from about the upper level of said second filter bed to a distance about one-eighth the entire length of said elongate sump wall.

7. The apparatus of claim 4 wherein said sump means comprises an elongate sump wall means and a bottom sump wall means closing said elongate sump wall means thereby defining an elongate sump chamber closed on three sides and open at the top and wherein said sump means is positoned within said container chamber such that the top said elongate sump wall means protrudes slightly above the top of said second filter bed but is lower than the top of said elongate container wall means whereby purified water overflowing said second filter bed will overflow the top of said elongate sump wall means and fall into said sump chamber.

8. The apparatus of claim 7 wherein said sump inlet means are distributed throughout the entire periphery of a section of said elongate sump wall means extending downwardly from about the upper level of said second filter bed to a distance about one-fourth the entire length of said elongate sump wall.

9. The apparatus of claim 7 wherein said sump means is supplied with a positioning cap, positioned and resting over the top of said elongate sump wall means, for supporting and positioning said sump discharge conduit means within said sump chamber, and wherein said positioning cap has a central passage means for the passage of said conduit means and means for engaging said conduit means whereby said conduit means is supported and vertically positioned within said sump chamber, said positioning cap having a downwardly extending lip means for laterally positioning said conduit means with respect to said elongate sump walls, and overflow passage means for the passage of purified water overflowing said second filter bed into said sump chamber.

10. The apparatus of claim 4 wherein said apparatus comprises an air distribution means positioned in said container chamber for dispersing and distributing air supplied via said container air supply means.

11. The apparatus of claim 10 wherein said air distribution means is a porous dispersing cap affixed to the outlet of said container air supply means.

12. The apparatus of claim 10 wherein said air distribution means is a thin plate, having a number of passages therethrough distributed over the area of said plate, and wherein said plate is positioned above the outlet of said container air supply means whereby the air stream supplied by said container air supply means impinges on said plate and is dispersed and distributed through said passages.

13. The apparatus of claim 4 wherein the internal face of said elongate container wall means is provided with clamping means for positioning and supporting said container air supply means.

14. A process for purifying and aerating aquaculture pools which comprises the steps of:
(a) passing a steam of contaminated water from said aquaculture pool through an aggregate filter bed composed of hard surfaced low absorption aggregate together with a stream of air whereby organic contaminants in said stream of contaminated water are entrapped by said aggregate and positively contacted with said air stream and aerobically biodegraded via the action of aerobic bacteria induced and promoted by said air stream;
(b) venting excess air and gaseous products of said aerobic biodegradation from water passing through said filter bed thereby affording purified water;
(c) collecting said purified water; and
(d) bubbling an air stream through said collected water whereby said collected water is aerated and discharging the purified-aerated water to an aquaculture pool.

15. A process for purifying and aerating aquaculture pools which comprises the steps of:
(a) drawing contaminated water, containing organic contaminants, from an aquaculture pool through a first filter bed of coarse hard surfaced low absorption aggregate whereby large particle-size contaminants are entrapped and attrited by the action of water passing through said first filter bed;
(b) contacting the water passing through said first filter bed with a stream of dispersing air flowing at a rate and pressure to vertically propel the contacted water through a second filter bed, of smaller particle hard surfaced low absorption aggregate, in contact with said first filter bed and of greater depth than said first filter bed whereby smaller sized contaminants are entrapped by said second filter bed and organic contaminants so entrapped are aerobically biodegraded via the action of aerobic bacteria induced and promoted by said air stream, and whereby additional contaminated water is continuously supplied to and passes through said first filter bed via the reduced pressure created by the propulsion of water from said first filter bed;
(c) venting excess air and gaseous products of said aerobic biodegradation from water passing through said second filter bed thereby affording purified water;
(d) collecting said purified water; and
(e) bubbling an air stream through said collected water whereby said collected water is aerated and discharging the purified-aerated water to an aquaculture pool.

References Cited

UNITED STATES PATENTS

| | | | |
|---|---|---|---|
| 2,653,908 | 9/1953 | Rodda | 210—169 |
| 2,770,366 | 11/1956 | Puzarowski | 210—274 X |
| 3,693,798 | 9/1972 | White | 210—169 |
| 3,661,262 | 5/1972 | Sanders | 119— 3 X |
| 3,578,169 | 5/1971 | White | 210—169 |
| 3,563,888 | 2/1971 | Klock | 210—14 |

CHARLES N. HART, Primary Examiner

R. H. SPITZER, Assistant Examiner

U.S. Cl. X.R.

210—169, 274

UNITED STATES PATENT OFFICE
CERTIFICATE OF CORRECTION

Patent No. 3,841,999            Dated December 18, 1972

Inventor(s) John P. Bennett

It is certified that error appears in the above-identified patent and that said Letters Patent are hereby corrected as shown below:

Column 1, line 54, change "displasing" to --displeasing--.

Column 2, lines 21-22, change "anerobically" to --anaerobically--.

Column 3, line 74, change "diagnonal" to --diagonal--.

Signed and sealed this 4th day of February 1975.

(SEAL)
Attest:

McCOY M. GIBSON JR.          C. MARSHALL DANN
Attesting Officer            Commissioner of Patents